(12) United States Patent
Swartz et al.

(10) Patent No.: US 8,152,361 B2
(45) Date of Patent: Apr. 10, 2012

(54) MUG WITH STIRRING MECHANISM

(76) Inventors: Sharron Swartz, Los Angeles, CA (US); John M. Serra, Los Angeles, CA (US)

( * ) Notice: Subject to any disclaimer, the term of this patent is extended or adjusted under 35 U.S.C. 154(b) by 0 days.

(21) Appl. No.: 13/088,895

(22) Filed: Apr. 18, 2011

(65) Prior Publication Data

US 2011/0192845 A1  Aug. 11, 2011

Related U.S. Application Data

(63) Continuation of application No. 11/516,427, filed on Sep. 5, 2006, now Pat. No. 7,946,752.

(60) Provisional application No. 60/714,594, filed on Sep. 6, 2005.

(51) Int. Cl.
  *A47J 43/044* (2006.01)
  *A47J 31/20* (2006.01)

(52) U.S. Cl. .................................. 366/243; 99/287

(58) Field of Classification Search .................. 366/130, 366/243–248; 99/287
  See application file for complete search history.

(56) References Cited

U.S. PATENT DOCUMENTS

| | | | |
|---|---|---|---|
| 1,225,690 A | 5/1917 | Wiberg | |
| 1,948,431 A * | 2/1934 | Rolph | 366/243 |
| 2,459,498 A | 1/1949 | Cameron | |
| 3,137,228 A | 6/1964 | Elow | |
| 3,307,474 A | 3/1967 | Kasher | |
| 3,339,476 A * | 9/1967 | De Troya | 99/287 |
| 3,744,767 A * | 7/1973 | Blasnik | 366/243 |
| 3,927,608 A | 12/1975 | Doyel | |
| 4,010,934 A | 3/1977 | McCord et al. | |
| 4,359,283 A * | 11/1982 | McClellan | 366/247 |
| 4,435,084 A | 3/1984 | Calhoun et al. | |
| 4,460,279 A | 7/1984 | Krasney | |
| 4,893,940 A | 1/1990 | Waisberg | |
| 5,047,252 A | 9/1991 | Liu et al. | |
| 5,312,014 A | 5/1994 | Hamlin | |
| 5,318,786 A | 6/1994 | Clarkson | |
| 5,407,270 A | 4/1995 | Barile et al. | |
| 5,461,968 A | 10/1995 | Portman | |
| 5,533,802 A | 7/1996 | Garganese | |
| 5,570,623 A | 11/1996 | Lin | |

(Continued)

FOREIGN PATENT DOCUMENTS

DE  3432289 C1  10/1985

(Continued)

OTHER PUBLICATIONS

Browse Coffee and Tea, Internet search Aug. 30, 2006, http://www.parkercoffee andtea.com/component/option,com_amazoop/c..., (1 page).

(Continued)

*Primary Examiner* — Charles E Cooley
(74) *Attorney, Agent, or Firm* — Blakely, Sokoloff, Taylor & Zafman LLP (57) ABSTRACT

A mug body has an open top. A lid is fitted to the open top. The lid has first and second top to bottom holes formed therein. An arm extends down from the bottom of the lid into the mug body. An actuator handle extends out from the top of the lid, through the second hole. The actuator handle is coupled to the arm to move the arm relative to the mug body. Other embodiments are also described and claimed.

17 Claims, 12 Drawing Sheets

U.S. PATENT DOCUMENTS

| | | | |
|---|---|---|---|
| 5,586,676 A | 12/1996 | Lynd | |
| 5,720,552 A | 2/1998 | Schindlegger | |
| 5,746,113 A | 5/1998 | Ko | |
| 5,765,947 A | 6/1998 | Dubroy | |
| 5,809,867 A | 9/1998 | Turner et al. | |
| 5,857,772 A * | 1/1999 | Washington | 366/243 |
| 5,911,504 A | 6/1999 | Schindlegger, Jr. | |
| 5,913,964 A | 6/1999 | Melton | |
| 5,918,761 A | 7/1999 | Wissinger | |
| 5,979,299 A | 11/1999 | Hornsby et al. | |
| 5,992,309 A | 11/1999 | Mulhauser et al. | |
| 5,996,473 A | 12/1999 | Milone | |
| 6,079,316 A | 6/2000 | Barden et al. | |
| 6,186,052 B1 | 2/2001 | Huang | |
| 6,210,032 B1 | 4/2001 | Murphy | |
| 6,224,253 B1 | 5/2001 | Dixon | |
| 6,295,920 B1 | 10/2001 | Barden et al. | |
| 6,422,133 B1 | 7/2002 | Brady | |
| 6,796,705 B1 | 9/2004 | Khubani | |
| 7,040,218 B1 | 5/2006 | Biolchini, Jr. | |
| 7,093,531 B2 | 8/2006 | Tardif | |
| 7,364,348 B1 * | 4/2008 | Jones | 366/130 |
| 7,384,182 B2 * | 6/2008 | Bhavnani | 366/130 |
| 7,578,231 B2 * | 8/2009 | Liu | 99/297 |
| 7,946,752 B2 * | 5/2011 | Swartz et al. | 366/247 |
| 2001/0036124 A1 * | 11/2001 | Rubenstein | 366/205 |
| 2003/0179647 A1 | 9/2003 | Simba | |
| 2007/0056447 A1 * | 3/2007 | Swartz et al. | 99/287 |
| 2010/0208549 A1 | 8/2010 | Kitson | |

FOREIGN PATENT DOCUMENTS

| | | |
|---|---|---|
| WO | WO-00/49929 | 8/2000 |

OTHER PUBLICATIONS

Non-Final Office Action (dated May 4, 2010), U.S. Appl. No. 11/516,427, filed Sep. 5, 2006, First Named Inventor: Sharron Swartz, (17 pages).

Notice of Allowance and Fee(s) Due (dated Jan. 7, 2011), U.S. Appl. No. 11/516,427, filed Sep. 5, 2006, First Named Inventor: Sharron Swartz, (5 pages).

"Bodum 10056-16 Tea Egg Tea Infuser", BeverageFactory.com, Internet search Aug. 30, 2006, http://www.beverage factory.com/spare/10056-16.shtml, (2 pages).

"Bodum Yo Yo Tea Infuser With Lid, Stainless Steel", Parker Coffee and Tea—Coffeemakers & Grinders, Internet search Aug. 30, 2006, http://www.parkercoffeeandtea.com/component/option,com_amazoop/c..., (4 pages).

"Nissan 11-Ounce Stainless Steel Coffee and Tea Traveler", Parker Coffee and Tea—Coffeemakers & Grinders, Internet search Aug. 30, 2006, http://www.parkercoffeeandtea.com/component/option,com_amazoop/c..., (5 pages).

PCT International Search Report (dated Dec. 20, 2006), International Application No. PCT/US2006/034706—International Filing Date Sep. 6, 2006, (11 pages).

* cited by examiner

MUG WITH STIRRING MECHANISM

This application is a continuation of U.S. patent application Ser. No. 11/516,427, filed Sep. 5, 2006, entitled "Mug With Stirring Mechanism", which issued as U.S. Pat. No. 7,946,752 on May 24, 2011, which application claims the benefit of the earlier filing date of U.S. provisional application Ser. No. 60/714,594, filed Sep. 6, 2005.

Various embodiments of the invention are directed to a drinking apparatus with an integrated stirring mechanism to stir the beverage contained therein. Other embodiments are also described.

BACKGROUND

There have been various attempts at providing a drinking container with a stirring mechanism, to allow the user to stir the beverage without requiring the use of a separate stirring stick or spoon. In one category of such products, the stirring mechanism has been motorized or power operated. An example can be found in U.S. Pat. No. 5,720,552 issued to Schindlegger, in which a stirrer is rotatably attached to the surface of the base of the drinking glass. The stirrer is actuated by a motor inside the base. In an earlier attempt, as seen in U.S. Pat. No. 4,435,084 issued to Calhoun, et al., the stirring mechanism is adapted to be manually actuated from the lower end of a cup. While the former may be too complicated a solution, the latter presents a difficulty for the user when the cup is resting in an automobile cup holder, as the user cannot easily access the bottom of the cup in that case.

In another category of drinking containers with integrated stirring mechanisms, the stirrer is attached at the top of the drinking vessel, rather than at the bottom. For example, U.S. Pat. No. 5,586,676 issued to Lynd shows a drinking container cap that has a stirrer depending downwardly from its interior surface. Such a stirrer, however, is fixed in relation to the lid of the container, requiring that the lid be removed in order for the user to stir the beverage. In a more recent effort, namely in U.S. Patent Application Publication No. 2003/0179647 issued to Simba, the stirring device is spring loaded and mounted to the top edge of a drinking vessel. The stirring device is shaped like a paddle and is submerged in the beverage content. The paddle pivots in response to the mechanism being operated by the thumb of the user's hand that is holding the vessel. This type of mechanism, however, requires that the top of the vessel remain substantially open so as to allow the pivoting movement of the paddle, making it unsuitable for use while riding in an automobile due to spillage.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

An embodiment of the invention is a mug or cup that has an integrated stirring mechanism, with a stirring element comprising an infusion or steeping compartment. Other embodiments are directed, more generally, to a beverage container, with an integrated stirring element. A further embodiment comprises a stirring element that is to be rotatably attached to the lid of a cup by being inserted through the lid. In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Mug Body

Figure 1:
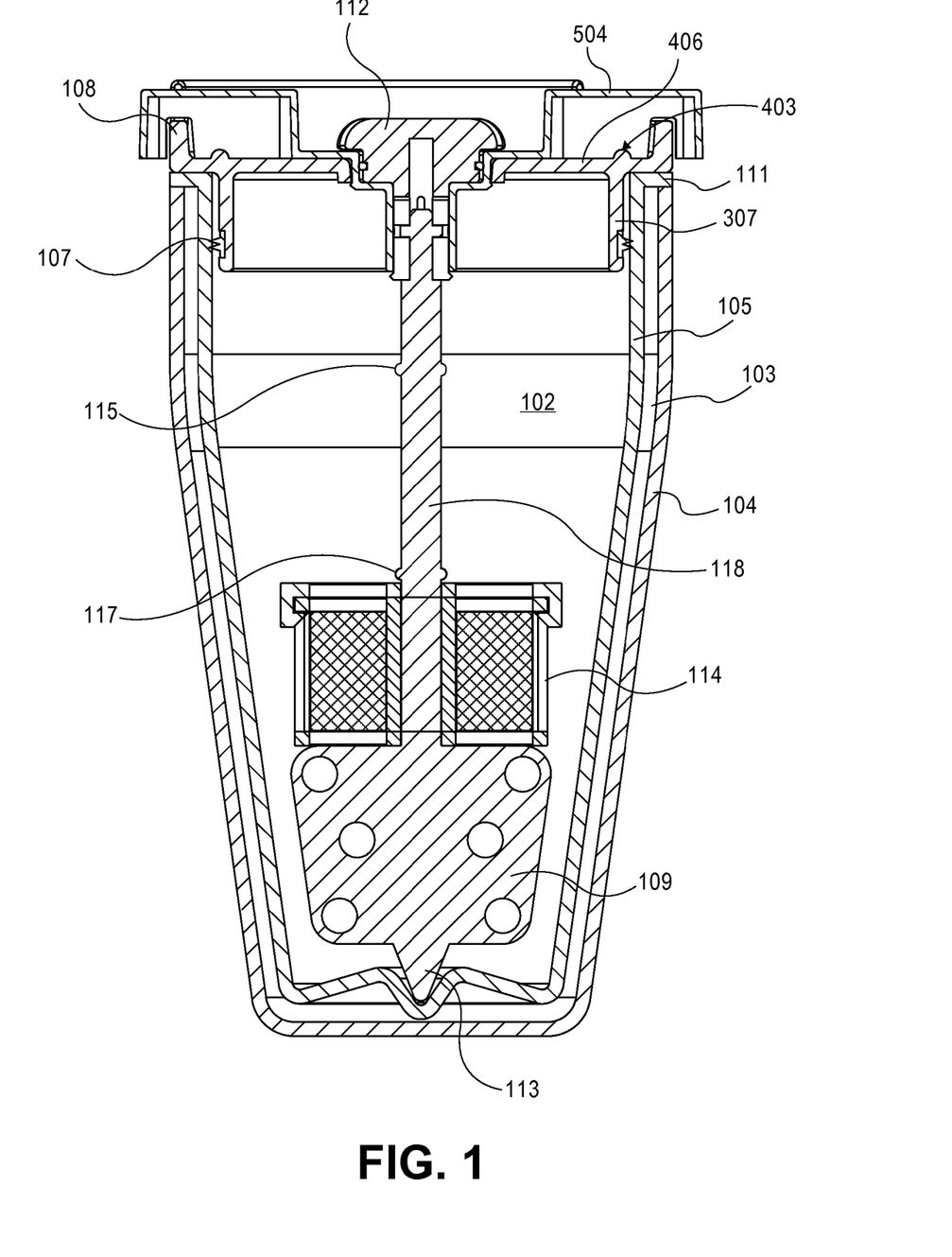
FIG. 1 shows a section view of a mug, as assembled, in accordance with an embodiment of the invention.
Figure 2:
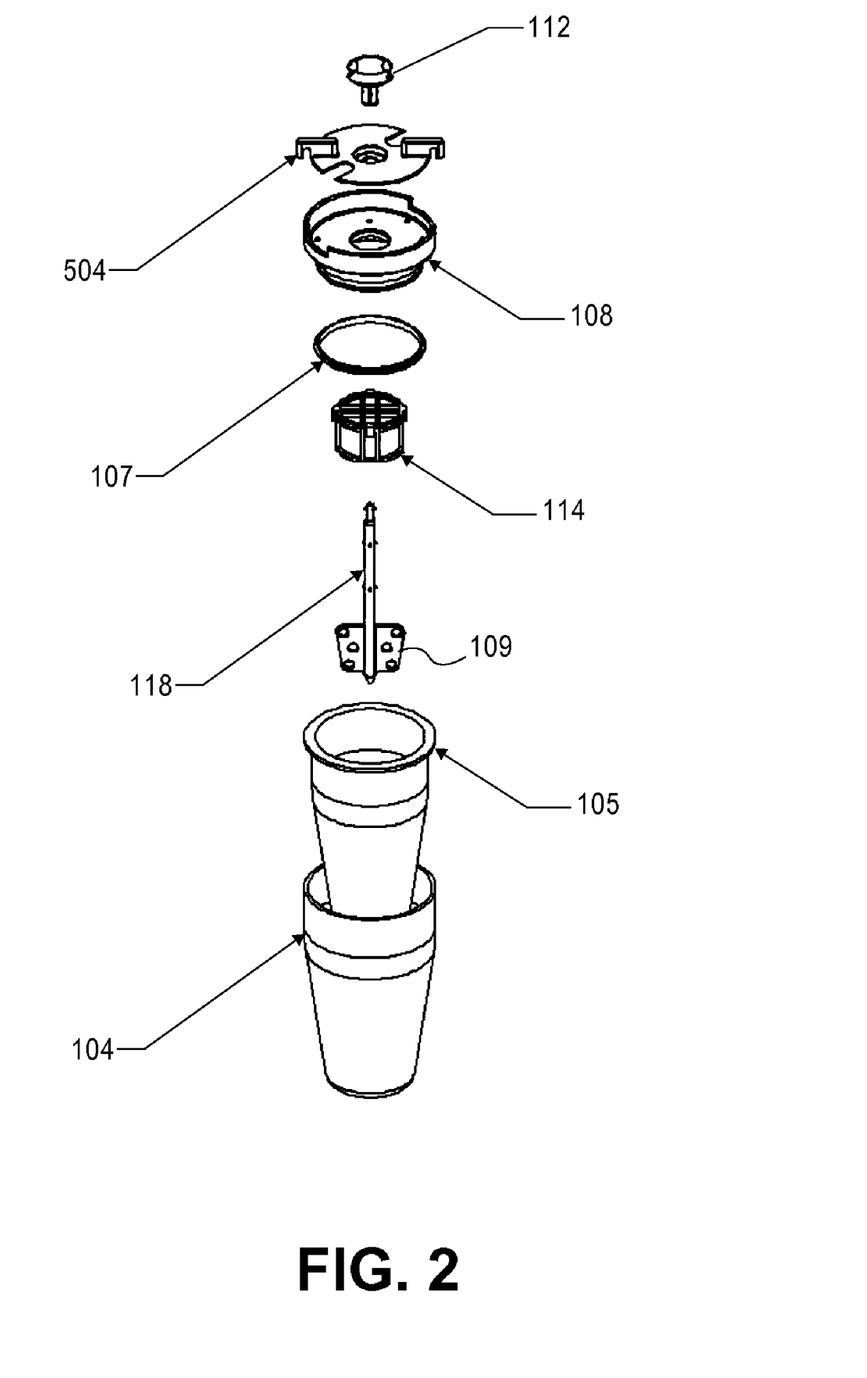
FIG. 2 shows an exploded view of the embodiment of FIG. 1.

As seen in FIGS. 1 and 2, an embodiment of the invention is a mug 104 that comprises a mug body to hold a beverage therein. The mug body is preferably thermally insulated. The mug body may be a single layered construction of any suitable materials, including, for instance, plastic, stainless steel, specially treated paperboard as used for disposable beverage cups, or other combinations. The preferred embodiment is dual layered as shown, having a mug body outer layer 104 and a mug body inner layer 105. These layers may be affixed permanently to each other during the manufacture of the mug, and are designed to create a gap 103 between them that serves to thermally insulate the beverage (which is actually in contact with the inner surface of the inner layer 105). The outer layer 104 has an open top and a cylindrical wall extending downward as shown that, in this case, diametrically reduces down to a closed bottom. This tapered exterior shape is also suitable for larger volume containers. As an alternative, the exterior shape of the mug body may be straight tubular, in part or in its entirety. The peak outside diameter may be 2.25 inches to 5 inches, and the overall height may be 5 inches to 10 inches. The outer surface of the outer layer 104 preferably has a non-slip hand grip portion 102, preferably located as shown in the upper half of the mug body.

The size and shape of the outer layer 104 is designed for the mug to fit a standard, vehicle cup holder or other similarly sized and shaped receptacle. Fixed holders are designed to accommodate just one size, e.g. the size of a 12 oz. soda can, or the size of a large, 32 oz. drink. Variable holders have a mechanical adjustment mechanism that adapts to different diameters of the mug. Overall and particularly from a diameter standpoint, the outer layer 104 is smaller than a standard pitcher or other relatively larger liquid container that is used primarily for beverage preparation and storage, rather than drinking, and that will not fit in standard vehicle cup holders. In one embodiment, the range of expected interior volume for the mug is 10 oz.-32 oz.

The mug body inner layer 105 has an outer diameter that is smaller than the inner diameter of the outer layer 104 so as to provide the gap 103 that serves to thermally insulate the mug.

The inner layer 105 has a rim 111 along its open top edge. The downward facing surface of the rim 111 is to cooperate with the edge of the open top of the outer layer 104, so as to close off the gap 103 as best depicted in FIG. 1. Other ways of forming and closing off the gap between the inner and outer layers are possible. The sidewall of the inner layer 105 may essentially conform to that of the outer layer as shown, in this case, tapering down to a closed, i.e. liquid tight, bottom. In the preferred embodiment shown, the bottom of the inner layer is formed to have a hollow, meant to fit the bottom blunt point 113 of an arm or shaft 118. The fit is preferably a loose fit that allows the shaft to rotate about its longitudinal axis relatively freely, despite the bottom blunt point 113 being in contact with the hollow surface. This stabilizes the lateral or side-to-side movement of the shaft 118, while the shaft is being rotated (as described below).

Lid

Still referring to FIGS. 1 and 2, a lid 108 is to fit the mug body at its top opening, to prevent spillage of the beverage that is inside. The lid can be fixed in several different ways, for example, by being screwed on via a threading mechanism or by being snapped on. In the embodiment depicted in FIG. 1, the lid is pressure fitted and removably held in place, against the inner surface of the inner layer 105 near the top opening of the mug, by a gasket seal mechanism. In this embodiment, a silicone seal or O-ring 107 is fitted inside a matching groove or hollow 303 (see FIG. 3) in an outer facing, lower portion 302 of the lid, and that entirely surrounds the lower portion 302. The groove or hollow is formed along the lid's lower side wall 307 that depends from a generally flat base 406 as shown, and sized and shaped to receive the seal. This seal 107 provides for a snug fit between the lid 108 and the inner surface of the inner mug layer 105. The snug fit is designed to prevent leaks of the beverage that is contained inside, while allowing the user to easily pry off the lid for washing the mug.

Figure 4:
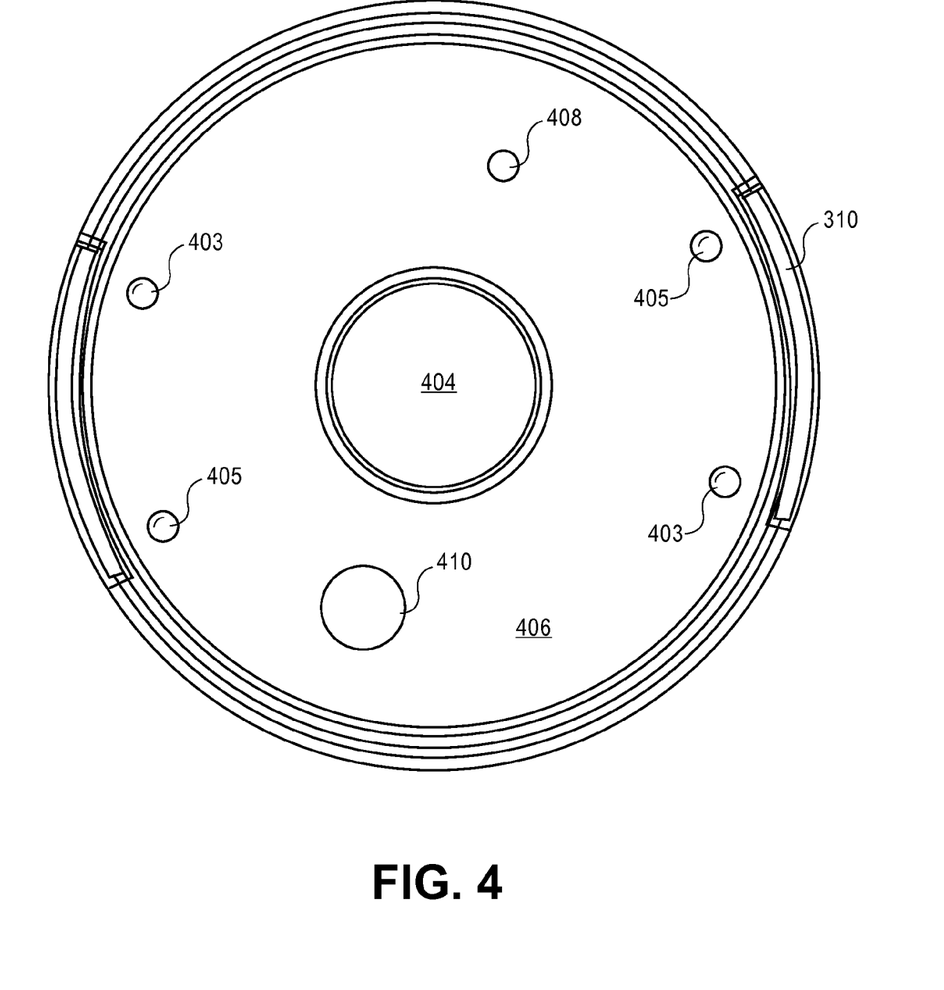
FIG. 4 shows a top view of the lid.

The lid 108 is generally designed to prevent significant leakage of the beverage. However, it has a number of holes that have been formed in its generally flat base 406, for various reasons. These are best seen in FIG. 4 which shows a top view of a preferred embodiment of the lid. There is a hole 404 that, in this embodiment, is approximately at the center of the base 406, and is designed to receive a lid cover/manual actuator assembly to be described below. There is also a sipper hole 410 through which the beverage will flow out of the mug body and may then be sipped by the user. To ease this flow, an air or vent hole 408 may also be provided through the base 406.

Note that in the preferred embodiment, the base 406 has a single horizontal wall as best seen in FIG. 1. However, as an alternative, the base 406 may have a more elaborate structure (e.g., a multi-layered wall that provides better thermal insulation).

Figure 3:
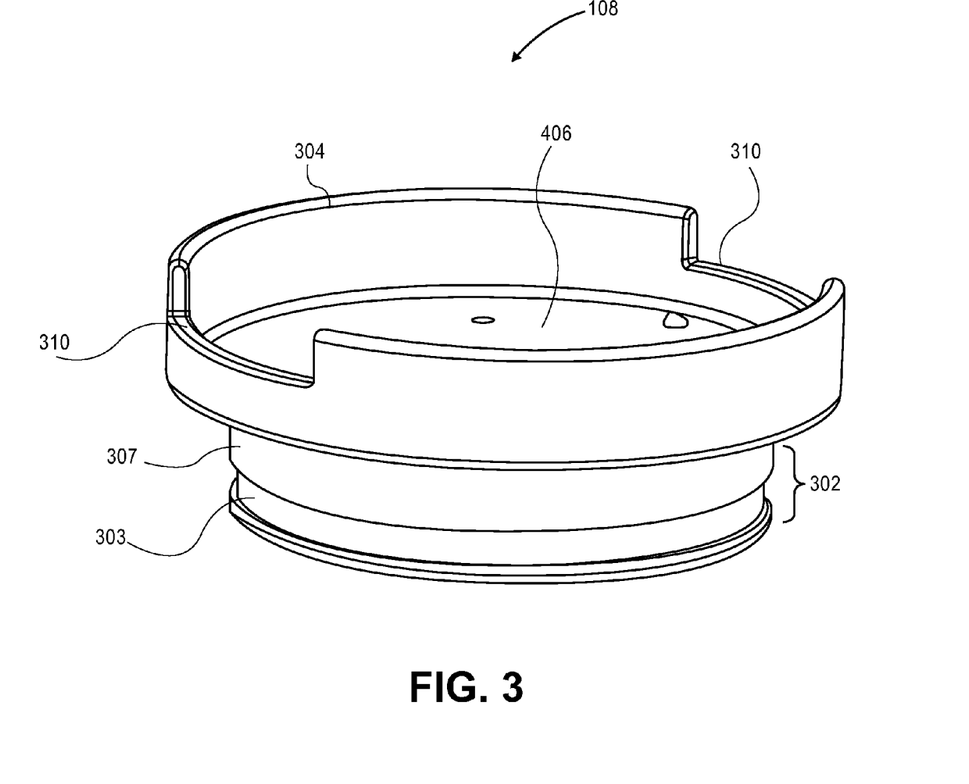
FIG. 3 shows a tilted side view of a preferred embodiment of the mug lid.

Referring now to FIG. 3, the lid also has a raised rim 304 at its periphery, whose height, thickness and shape should be selected to feel comfortable when pressing against the users mouth and lips, so as to provide the user a more pleasant drinking experience (in other words, a comfortable mouthpiece for the user to sip from). The rim 304 helps contain any spillage to the area it surrounds, atop the lid. In addition, it provides distance so that the user's face does not bump into the lid and handle assembly. The sideways and outward facing surface of the rim is, in this embodiment, coextensive with the corresponding surface of the mug outer layer 104. The rim 304 entirely surrounds the top surface of the base 406 where the holes 410, 408 are formed, to also prevent spillage of any liquid that has leaked out of the holes 410, 408 and accumulated on top of the base 406. Although the rim 304 appears in the figures as a separate, vertical wall connected at a right angle to the horizontal top surface of the base 406, an alternative is a less abrupt interface between the top surface of the base 406 and the inward facing (sideways) surface of the rim 304.

Sipping Mechanism

Figure 5:
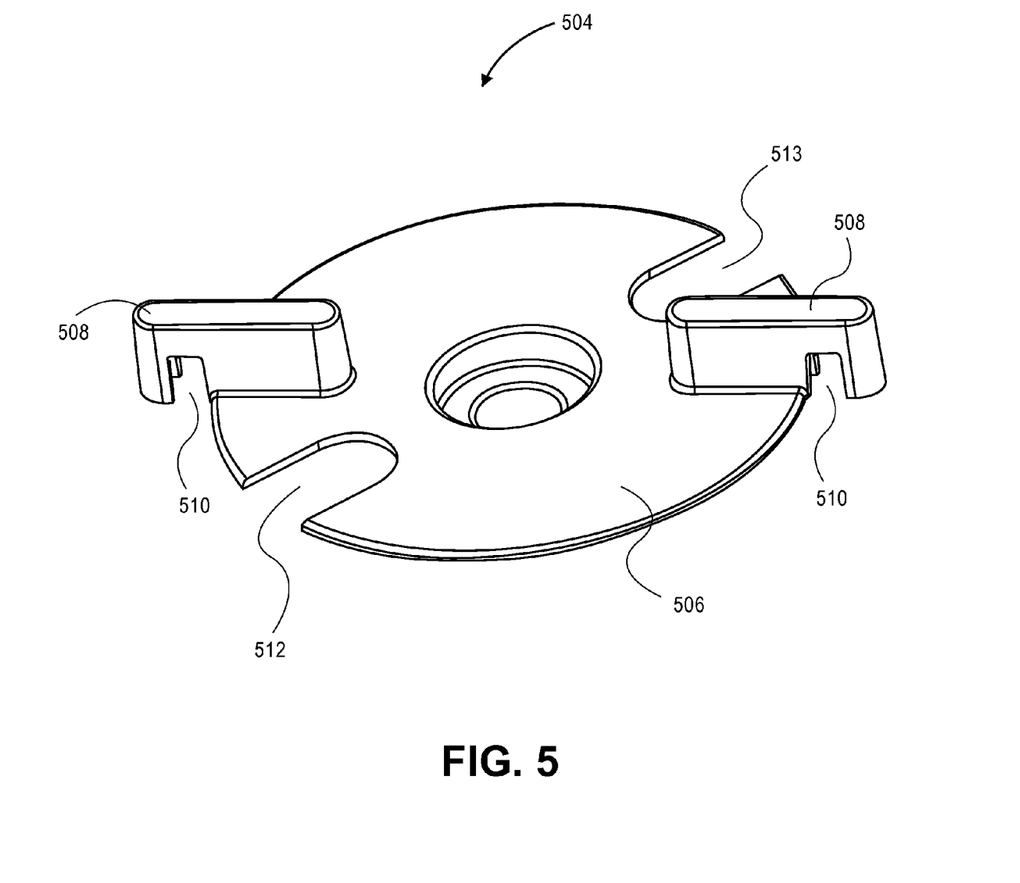
FIG. 5 shows a tilted top view of an example lid cover, in accordance with an embodiment of the invention.

The mug has a sipping mechanism integrated with the lid 108 as follows. The raised rim 304 has two top facing sections 310 that are notched out or recessed. These provide slots for the handles 508 of a lid cover 504 (see FIG. 5 for a tilted top view of a preferred embodiment of the lid cover 504). The lid cover 504 is to lie flat against the top side of the base 406 of the lid. In this embodiment, the two recessed sections 310 are directly across from one another, through the center of the lid. The recesses are designed to receive and guide the respective handles 508 of the lid cover 504 (see FIG. 5). Note how the handles 508 extend out beyond the perimeter of the lid cover 504. A notch 510 is formed on the underside of each handle 508 beyond the perimeter of the lid cover 504. This notch 510 is sized to fit over the recessed section 310 of the raised rim 304 (see FIG. 3).

The lid cover 504 has a pair of cutouts through its generally flat base 506, that are also referred to as sipper and air hole indentations 512, 513, respectively. These are large enough to expose their respective sipper and air holes, to provide for beverage and airflow out of and into the mug. Note how the handles 508 on the lid cover 504, as well as their corresponding recesses 310 in the raised rim 304 (FIG. 3), should be positioned away from the sipper and air holes (and their respective cutouts), so as to provide an unobstructed drinking experience. Bumps or other limiting features 403, 405 are formed, in this embodiment on the top side of the lid 108 (see FIG. 1), so as to provide a detent for locking the lid cover 504. The lid cover 504 can be moved to lock into an open position (indentations 512, 513 exposing the sipper and air holes, allowing the user to sip the beverage) and a closed position (sipper and air holes are covered by the base 506 of the lid cover 504, thereby sealing the mug body). The lid cover 504 may be rotated between the open and closed positions, by the user pushing and/or pulling on one or both handles 508 in a direction perpendicular to the longitudinal axis of the mug. Other types of open/closed locking mechanisms are possible to maintain the lid cover 504 in its respective open and closed positions. Other ways of providing a sipping mechanism that has an open and closed position in the lid 108 are possible.

Figure 6:
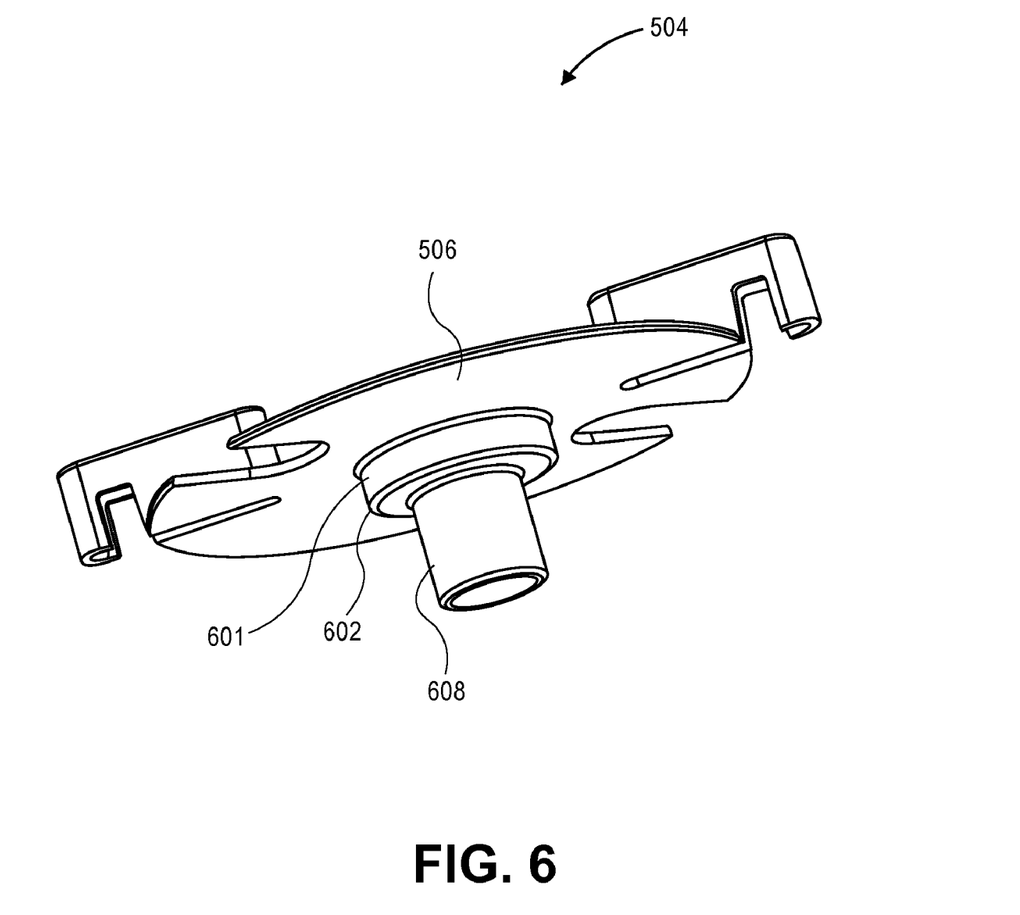
FIG. 6 shows a tilted bottom view of the lid cover.

Turning now to FIG. 6, a tilted bottom view of the lid cover 504 is shown. The bottom of the lid cover 504 has an upper section 601 extending downward from the bottom side of the base 506. A ridge or lip 602 is formed on the sidewall of the upper section 601. The upper section 601 is designed to snap fit into the hole 404 of the lid 108 (see FIG. 4), while still allowing for the lid cover 504 to rotatably slide relative to and in parallel with the lid 108 (between the open and closed positions). An additional O-ring or seal (e.g., fitted to the outward facing side of the sidewall of upper section 601) may or may not be necessary between the lid cover 504 and the lid 108, to prevent leakage of the beverage.

Stirring Mechanism

The stirring mechanism provides for movement of the shaft/arm 118 to stir the beverage, as controlled from above the lid 108. The preferred stirring mechanism is now described. Referring back to FIGS. 1 and 2, as well as FIG. 6, the lid cover 504 has a tubular section 608 that cuts through the base 506. The tubular section 608 in this case is concentric with the upper section 601 and is located so as to extend through the hole 404 of the lid 108. The section 608 is designed to receive therein a manual actuator handle 112. In this example, the actuator handle 112 comprises a knob that is rotatable about its longitudinal axis which is fixed, and whose side profile is depicted in FIG. 7.

Figure 7:
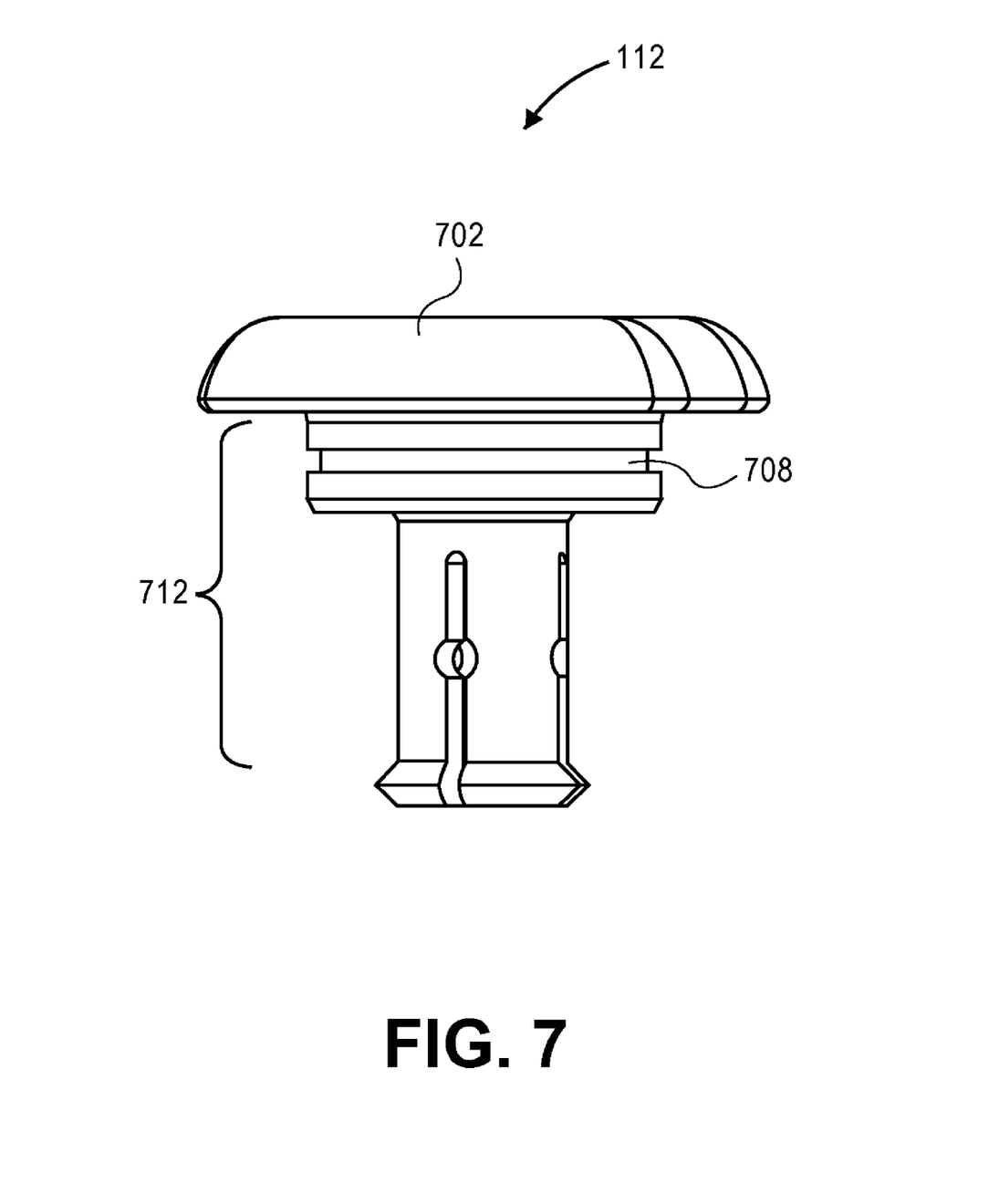
FIG. 7 shows a side profile of an example manual actuator handle, in accordance with an embodiment of the invention.
Figure 8:
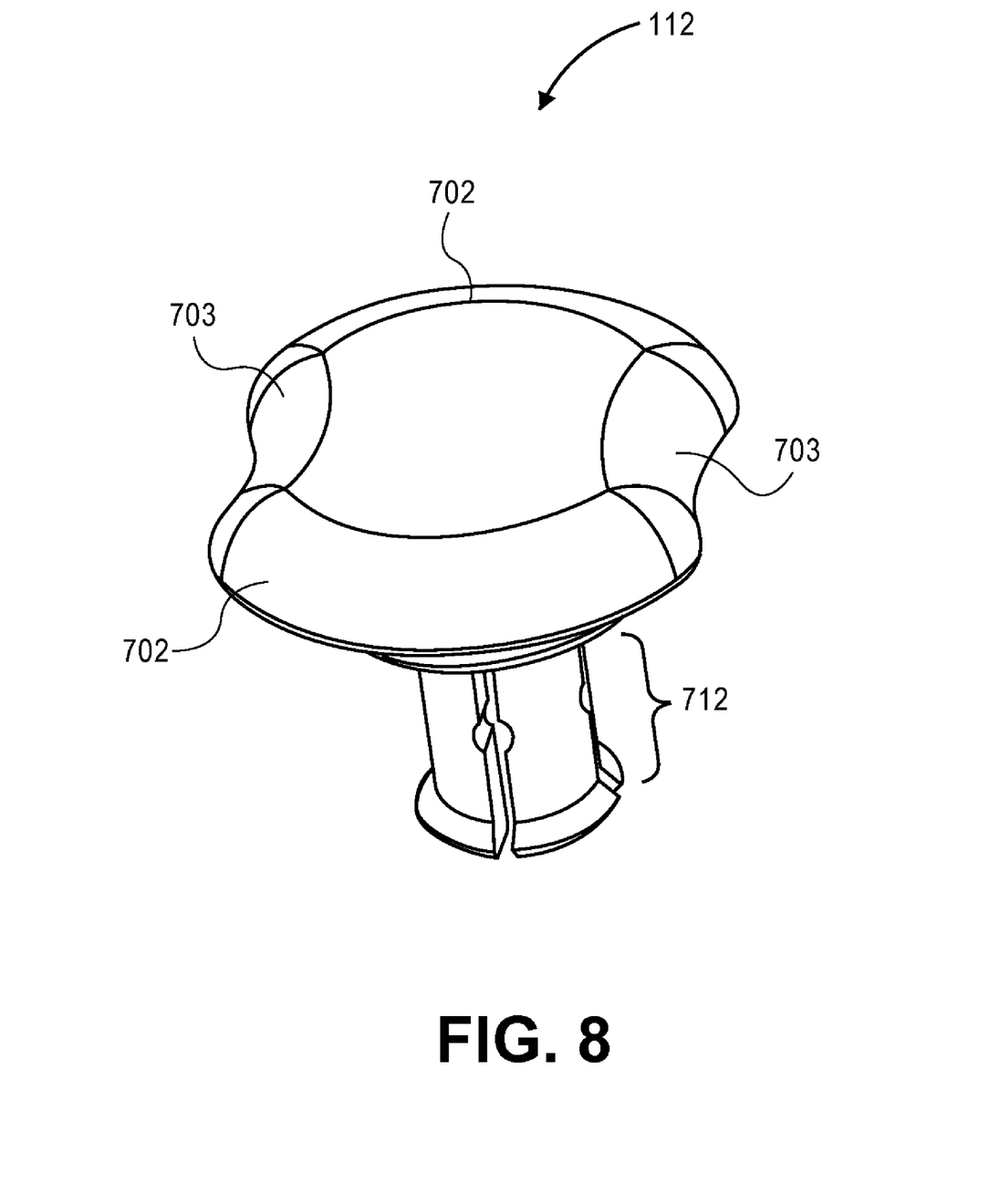
FIG. 8 shows a tilted profile of the actuator handle.

As seen in FIG. 7, a top portion 702 of the knob has two substantially circular sides, and two sides that have finger grips 703 molded therein, as best seen in the tilted view of FIG. 8. Although the edges of the top portion 702 are shown as substantially rounded, alternative surface treatments are possible. The flat top profile along with the smooth rounded edges, helps reduce any interference with the user's nose or face, while the user is drinking from the mug. The height of the handle 112 is preferably just enough so that the user's fingers can get a comfortable grip on each side, yet remain as low in profile as possible as to not interfere with any part of the user's face during drinking. The molded finger grips may also have ridges that allow the user to better grip the knob and to rotate it in a back and forth motion or around in a continuous direction, to mix the beverage or accelerate the steeping or infusion process, or both.

A lower portion 712 of the knob is journaled by the cylinder 608 (see FIG. 1). As depicted in FIGS. 7 and 8, in this embodiment, the lower portion 712 is comprised of two cylindrical sections. The upper section, as depicted in FIG. 7, is a shorter and fatter cylindrical section that is sized to fit inside the section 601, and is fitted with a slotted recess 708 around its circumference. The recess is designed to accept an O-ring or other seal piece, to help in leak prevention.

The lower section of portion 712 is longitudinally slotted as shown (in this example, to form four equally sized leaves) and fitted with cut outs that are intended to key fit the top portion of an agitator shaft 118 (see FIG. 1). Snap ridges or lips are formed towards the lower end of the portion 712 as seen in FIG. 7 and in FIG. 1, to fix the knob longitudinally inside the cylinder 608, while allowing free rotational movement of the knob, independent of the lid cover 504. The mechanism may be designed to allow the actuator handle 112 to be rotated (while fitted inside the lid cover 504), either back and forth, e.g. over a limited travel range, or endlessly in one direction, in response to a twisting motion of the user's forefinger and thumb while gripping the top portion of the agitator handle 112. It should be noted that while material clearances should prevent the free flow of leakage around the agitator handle 112, and more specifically any flow between the section 608 inner surface and the outer surface of the agitator handle 112, other embodiments of the handle 112 may include a push down gasket sealing modification to ensure further resistance to leakage.

In the preferred stirring mechanism, as depicted in FIG. 1, the shaft or arm 118 has an upper end that is coupled to the agitator handle 112 within the section 608, to the lower portion 712 (FIG. 7). The shaft 118 is, in this embodiment, located at about the center of the mug body and is to rotate freely about its longitudinal axis via its keyed connection to the agitator handle 112. The top portion of the shaft 118 is keyed to fit corresponding hollow or slotted sections in the portion 712 of the handle 112, preferably locking the shaft, i.e. preventing the shaft from moving vertically or laterally relative to the lid. This allows the shaft, as well as the connected infusion compartment to be described below, to be removed from the mug body together with the lid as one piece.

At some point below the coupling mechanism that connects the shaft 118 to the handle 112, an infusion compartment 114 is connected to the shaft 118. In other words, the infusion compartment is suspended in the mug body from the lid, by the shaft 118, at any suitable height above the bottom of the mug body. In the preferred embodiment shown, the infusion compartment 114 is fixed relative to the shaft by a keyed connection to the exterior surface of the shaft 118. For example, the shaft 118 comprises, in this case, a square shaped rod that is meant to act as a keyed connection for a corresponding hollow that is formed centrally in the infusion compartment 114. Bumps or other limiting features 117 are formed on the exterior surface of the shaft (see FIG. 1), in positions that, in this embodiment, lock the infusion compartment in place, limiting its movement longitudinally relative to the shaft 118, but allowing rotational movement of the compartment with the shaft (about the shaft's longitudinal axis). In the example here, the infusion compartment 114 is meant to be slid onto the shaft 118 from the top end, and pressed over a set of bumps 117 which restrict the compartment 114 from floating in the liquid beverage. Other ways of attaching the compartment 114 to the shaft for movement with the shaft (e.g., a jaw mechanism that laterally grips the shaft) are possible. In all such mechanisms, the infusion compartment is deemed suspended in the mug body by a movement mechanism that is based in the lid and that provides for controlled or predefined movement of the infusion compartment relative to the mug body, to promote infusion and stirring of the beverage.

Note that there may be two or more positions for bumps 117 defined vertically along the shaft 118, to fix the compartment 114 in at least two different positions. A position 115 that is closer to the top of the mug may be referred to as the "light brew position". The infusion compartment in this position remains closer to the surface of the liquid, so that after the user's initial sips, the liquid level will fall below the infusion compartment, thereby halting the infusion process. Another, lower position may be referred to as the "dark brew position". In that case, the infusion compartment is suspended deeper in the liquid and therefore allows the beverage to steep for a longer period of time, beyond the initial sips of the user. A particular embodiment of the infusion compartment 114 will be further described below.

The stirring mechanism may also include one or more agitation elements or flaps 109 connected to the shaft 118 that encourage further fluid flow and mixing while the shaft is being rotated. In the example shown, the flaps 109 are located below the infusion compartment 114, although, as an alternative, they could be located above it. Also, the figures show two flaps at about 180 degrees to each other on either side of the shaft 118 as the preferred embodiment, however, a single flap or more than two flaps are also possible. The vertical and lateral dimensions of the flap 109 should be selected to fit the flap within the mug body, as well as provide the desired amount of turbulence to the liquid during rotation. Each flap in this embodiment also has a number of holes through it that are meant to create additional turbulence when the flap is rotating.

As mentioned above, at the lower end of the shaft 118, below the steeping compartment 114 and flap 109, there is a blunt tip which is sized to fit a corresponding hollow in the mug bottom. This aspect is designed to stabilize the shaft 118 in the lateral direction while still allowing free rotational movement of the shaft around its longitudinal axis.

Infusion Compartment

Figure 9:
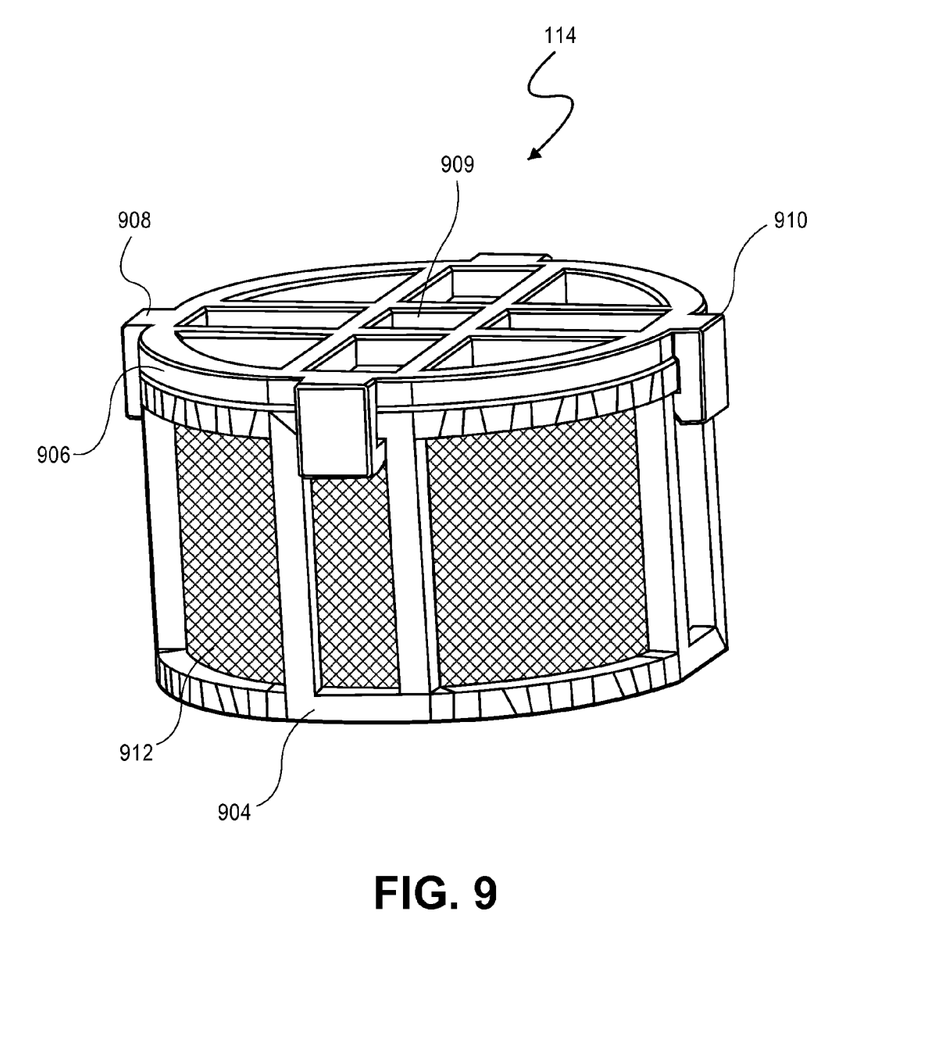
FIG. 9 shows a side view of an embodiment of the infusion compartment.

Referring now to FIG. 9, a tilted side view of an embodiment of the infusion compartment 114 is shown. In this embodiment, the compartment 114 is a removable and reusable attachment that can be fixed to the shaft 118 to rotate therewith. The compartment is designed to hold bagged or loose herbs (e.g., tealeaves) or other infusible beverage substance. The compartment 114 has sufficient volume to hold the proper amount of infusible material, for infusing the liquid volume within the mug body. The compartment 114 has an outer skeletal structure or frame 904 that in this example is made of a rigid plastic or other suitable material that can be immersed in a hot beverage. At the top and bottom sides of the skeletal structure 904 and, in this example, located centrally, are hollows 909 that are keyed to fit the cross-section of the shaft 118 of the stirring mechanism (in this case a square cross-section). The top side of the structure 904 forms a lid 906 that is hinged at position 908, with a clasp 910 provided to keep the lid in the closed position. The lid 906 may alternatively be at the bottom or at the sidewall of the structure 904. The open areas of the structure 904 are covered with a mesh barrier, to allow liquid to pass freely while restricting the infusible beverage substance to inside the structure 904 while the beverage is stirred by the rotating compartment 114. The ribs of the sidewall of the structure 904 may be designed to add to the turbulence in the mug when the shaft 118 is rotating.

The compartment 114 is preferably designed to be easily removed from the shaft 118 by the consumer, by in this case pushing the compartment in the direction of the longitudinal axis of the shaft, along the shaft. In this example, the compartment is moved away from the flaps 109 and towards an open, top end of the shaft (assuming the shaft 118 has been decoupled from the handle 112). Once released from the shaft, the compartment may be opened, by opening the clasp and pivoting the lid 906 upwards about the hinge. The lid 906, however, need not be hinged and may be entirely removable from the rest of the structure 904. Once open, the user can fill the compartment with the infusible beverage substance, affix the lid 906 back onto the structure 904, and reattach the compartment 114 to the shaft 118. The compartment 114 may be omitted in cases where the beverage is not an infusible drink.

Although the compartment 114 is shown in FIG. 9 as being substantially drum-shaped, alternative box-type shapes that allow the user to easily place therein (and remove) bare, loose infusion substances are possible. Also, the mechanism for attaching the compartment 114 to the shaft 118 may be different (e.g., one that uses jaws at the perimeter of the compartment, to grasp the shaft, rather than coupling through its center). There may also be a second compartment, attached to the shaft 118 in a manner similar to the infusion compartment 114 but longitudinally offset from it. This second compartment need not have a mesh barrier, and may be used to hold beverage flavoring ingredients, for example a citrus wedge, a piece of ginger or a piece of sugar cane.

Other Embodiments

Figure 10:
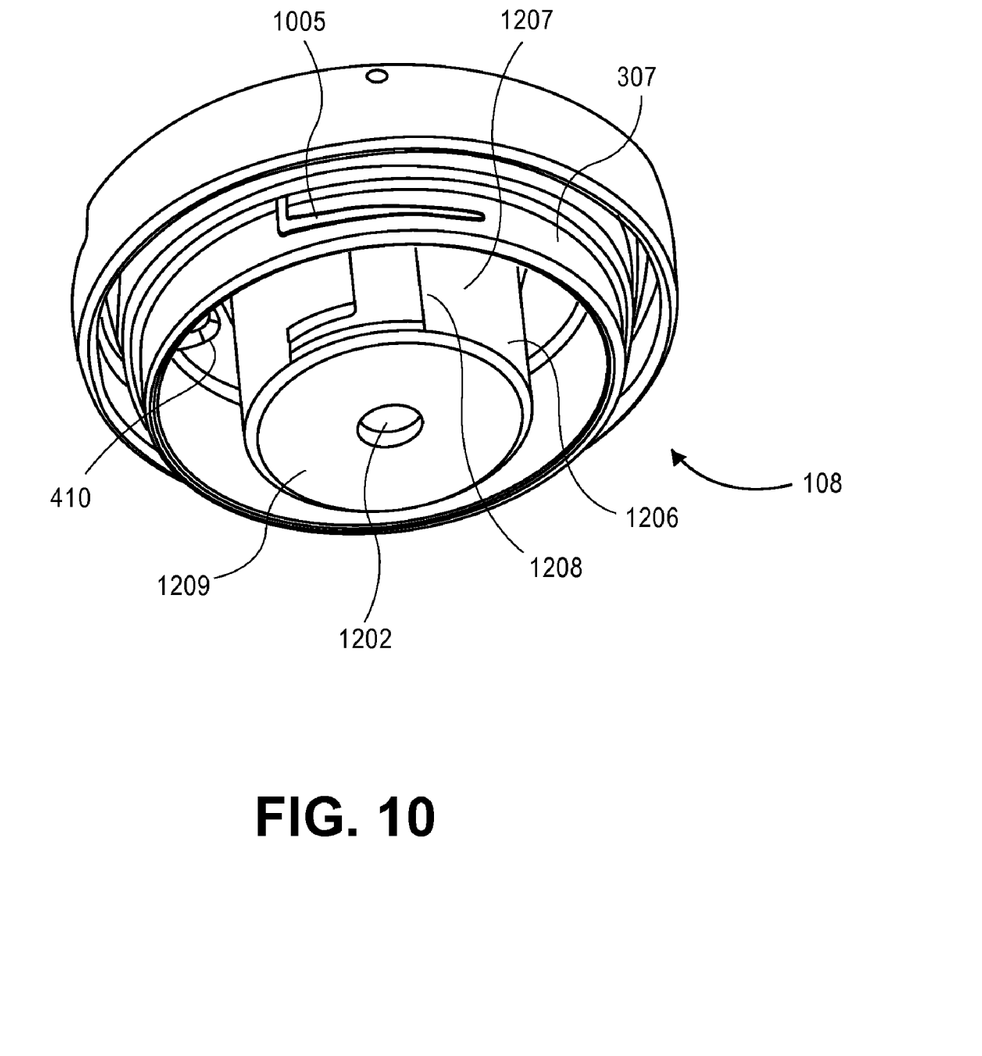
FIG. 10 depicts a bottom view of the lid, according to another embodiment of the invention.
Figure 11:
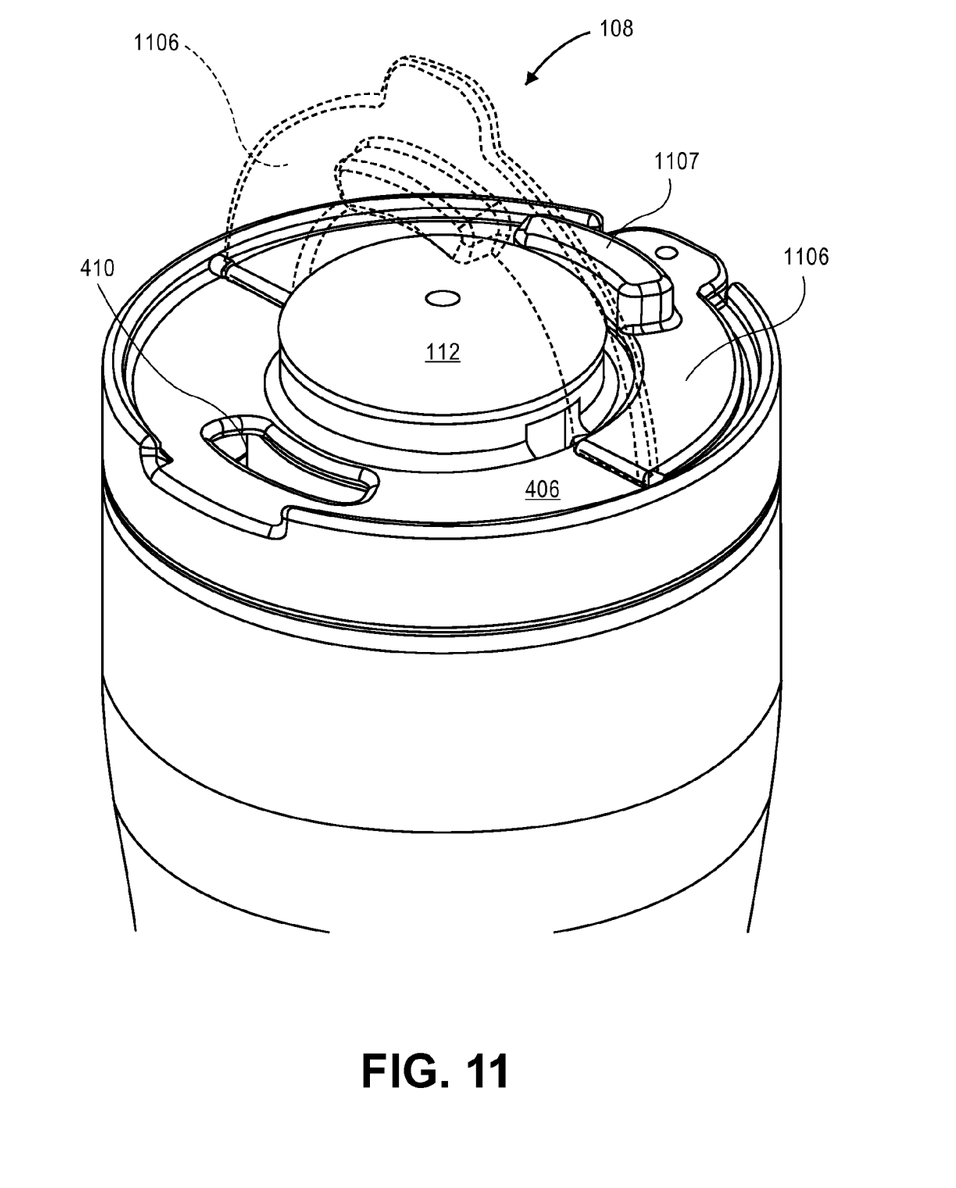
FIG. 11 shows a top view of the lid of FIG. 10.
Figure 12:
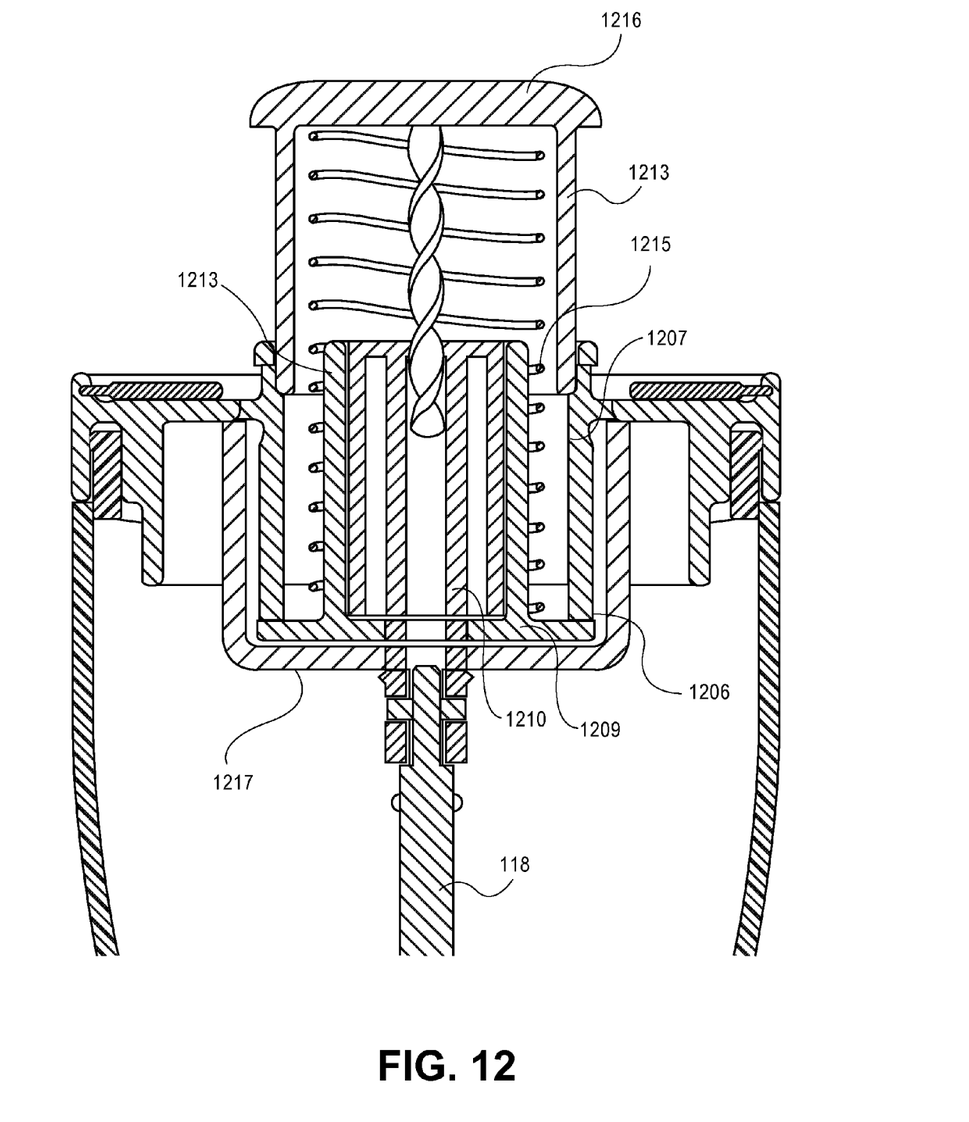
FIG. 12 illustrates a sectional view of the lid of FIG. 10.

Turning now to FIGS. 10-12, another embodiment of the invention is illustrated as a mug that a different lid, stirring mechanism, and sipper. As seen in FIG. 10 which shows a bottom view of the lid 108, the lid has the cylindrical wall 307 that extends down from its base and on the sideways outward facing surface of which are formed screw-on splines 1005. A corresponding thread (not shown) is formed on the inner surface of the inner layer 105 near the top opening of the mug, allowing the lid to be screwed onto the top edge of the mug.

The embodiment depicted in FIG. 11 features a different sipping mechanism. In this case, the top to bottom hole 410 that is formed in the lid 108 (to allow beverage flow for drinking) is closed and opened by a flap 1106 that pivots about an axis that crosses the handle 112 at the top surface of the lid 108 as shown. A bottom surface of the flap 1106 has a protrusion 1107 that mates with the hole 410, to help prevent leakage in the closed position. FIG. 11 shows the flap 1106 in its open position, in this case pivoted all the way back against the base 406 of the lid 108.

FIGS. 10-12 also illustrate a different stirring mechanism, referred to here as screw drive mechanism. In this case, the arm or shaft 118 extends down from the bottom of the lid and is rotated about its fixed, longitudinal axis. The movement however is in response to the actuator handle 112 atop the lid being pushed along a path by the user's finger, rather than being rotated about its axis. In this embodiment, the drive mechanism causes the linear, and this case entirely vertical, movement of the handle 112 to be translated into rotation of the shaft 118 below it. In this example, the handle 112 looks like a button from the top of the mug and is fixed laterally, at about the center of the lid. The handle is spring loaded to "pop up" when it has been unlocked by the user. The user can unlock the handle 112 by twisting or rotating it at a predefined distance and then releasing from its down position. FIG. 11 shows the handle 112 in its down position. FIG. 12 shows a sectional view with the handle in its pop up position.

There are at least two variations to this embodiment of the invention. In one embodiment, the screw drive mechanism limits rotation of the shaft 118 to just one direction. Rotation may be actuated in this case when pushing the handle down. In the other embodiment that is depicted in FIG. 12, the shaft 118 rotates in both directions. When pushing down on the handle, the shaft rotates in one direction, and when the handle pops up, the shaft rotates in the other direction.

FIG. 10 and FIG. 12 show further details regarding an implementation of the screw drive mechanism. A bearing structure 1206 extends down from a bottom surface of the base of the lid 108. The structure 1206 is cylindrical in this case as best seen in FIG. 10. The structure 1206 has a hole 1202 through which a rotating hub 1210 is passed and journaled for rotation about its longitudinal axis. A handle guide 1208 has an open region that is used to guide and lock the handle 112 between its down and locked position, and its popped up position. This guide and lock region is substantially L-shaped as shown in FIG. 10. In this case, the handle guide 1208 and the bearing structure 1206 are formed as openings in the same cylindrical piece that extends down from the base of the lid. The former is in the sidewall 1207 and the latter is in a bottom plate 1209.

The handle 112 has a top 1216 from which depends downward a sidewall 1213, as best seen in FIG. 12. One or more button lock tabs are formed on the sidewall 1213, to engage with the substantially L-shaped guide and lock opening in the handle guide 1208 of the lid. The tabs are shaped and dimensioned to be slidably guided by the vertical section of the guide and lock opening, and hook up with the horizontal section of that opening, after having been moved into position therein by the user rotating the handle 112. Once in this lock position, the handle is kept there by the force of a compressed spring 1215 that is pushing against the bottom plate 1209 and the top of the handle 112. A spring guide section 1213 is provided that serves to not only guide the spring 1215 on its outward facing surface, but also serves to journal the hub 1210 on its inward facing surface. The guide 1213 and plate 1209 may be a separate, single piece that is attached to the rest of the lid during manufacture. Other ways of locating the spring, so as to urge the handle 112 into its popped up position, are possible. The tabs may also serve to limit upward movement of the handle to prevent the handle from completely dislodging itself from the lid, under the force of the spring. An outer cup 1217 may be fitted over the bearing structure 1206, to further support the hub 1210 about its axis and to prevent beverage leakage from the mug body.

Further details regarding the screw drive mechanism are as follows. A linearly reciprocating, elongated helical screw shaft is provided, a top portion of which is attached to the top 1216 of the handle 112. The attachment is such that relative rotational movement between the two parts is precluded. In this embodiment, both the handle 112 and the attached helical shaft move only linearly, in this case, guided along the vertical axis, and not rotationally relative to the lid. This is achieved by keying the handle to the corresponding slot in the L-shaped opening of the handle guide 1208.

In the screw drive embodiments, the arm or shaft 118 is coupled at its top portion with a bottom portion of the rotating hub 1210, to rotate therewith. In one embodiment, the helical shaft never disengages from the rotating hub 1210, during operation of the handle 112 to stir the beverage. In that case, the rotational movement of hub 1210 is directly connected to linear movement of the helical shaft. This in turn allows the stirring element that is attached to the arm or shaft 118 to spin in one direction while the helical shaft is on its way down, and in the other direction while the helical shaft is on its way up.

In one embodiment, when the handle 112 is pressed down, the helical shaft in the handle passes through and engages a slot in the rotating hub 1210. Since the helical shaft is precluded from rotating about its longitudinal axis, its linear movement through the slot forces the hub 1210 to rotate about the axis. In other words, the slot rotates about the axis and along the grooves of the helical shaft as it engages the downwardly moving helical shaft, thus rotating the stirring element attached below it. Other ways of translating linear movement of the handle 112, as actuated manually from above the lid, into rotational movement of the arm or shaft 118 are possible.

For example, in yet another embodiment, a 3-piece hub assembly is used, instead of a possible single piece version in the above embodiment, that constrains the hub to spin in a single direction. In such an assembly, the lower portion has a connection to the shaft 118, cylindrical walls and a top surface that is fitted with hollows to receive teeth formed in the middle section (to be described below). The top of this section also has a round hollow found at its center that is meant to fit the middle section. The middle section has a cylindrical base which is sized to fit the hollow found at the center of the lower section. This piece is fitted with downward facing teeth that fit into the corresponding recess found in the lower piece. The top is fitted with a slot which is meant to fit the helical shaft. The top section is meant to be snap-fitted to the lower section basically encasing the middle section. When the top and bottom are snapped together with the middle section placed inside of them, there is enough head room for the middle section to "disengage its teeth" from the lower section while the handle moves into its up position. This allows the assembly to spin in only one direction. When the handle is pressed again, the "teeth" find their hollows and the assembly is ready to operate.

In a further embodiment of the invention, a method for preparing a beverage uses a stirring device similar to the shaft and stirring element described above. An end of the shaft 118 is inserted through a top to bottom hole in a lid of a beverage cup. The lid and hole are shaped and dimensioned to journal the shaft for rotation. An infusion compartment as described above may be attached to the shaft. The lid is fitted to an open top edge of the beverage cup, such that the journaled shaft and the attached infusion compartment are located inside the cup. This process may be performed by a worker of a retail coffee or tea shop, or a customer thereof. The shaft may be as described above including a rounded blunt point at its bottom end, to prevent damaging the bottom of commonly found fast food cups that are made of, for example, paper or Styrofoam.

In this embodiment, the upper portion of the shaft that may have been inserted through the hole in the lid, has breakaway sections, so as to accommodate the different heights of cup sizes that are commonly found, e.g. a lower section for accommodating small cups, a medium section for accommodating medium size cups, and a top section for accommodating larger (taller) cups. The end of the shaft, at the tall section, preferably forms a point sharp enough to puncture commonly found fast food lids. This pointed section should be broken off by the user prior to using the beverage cup. The shaft may also be "broken away" at the desired one of the different sections, so as to fit the height of the selected cup. The top end of the shaft thereafter may then be used as a handle, by being twisted back and forth between the fingers of the user's hand.

Note that the entire assembly including the shaft and the attached infuser compartment may be disposable in this case, such that for every beverage that is made by the coffee or retail shop, a separate stirring mechanism is inserted into each new beverage cup. In a further embodiment, a knob or other retaining portion may be fitted to the top of the shaft, so as to provide a larger handle for the user, as well as prevent the shaft and the infusion compartment from sliding out of the hole. This further handle piece can be designed to snap or pop onto the top end of the shaft.

The invention is not limited to the specific embodiments described above. For example, the flap 109 of the stirring element is shown as being integrally formed with the shaft 118 (out of the same piece of material). An alternative there is to manufacture the flap 109 as a separate piece, and provide an attachment mechanism (e.g., one having limiting features similar to bumps 117) for attaching the flap 109 to the shaft. Also, the base of the lid has a completely flat and horizontal surface as seen in the figures, and the raised rim has a constant height all around the base. An alternative there is to provide the raised rim with varying height, and/or a lid whose base has an uneven or sloping, i.e. not entirely flat, top surface. In yet another alternative, the manually actuated arm movement described above for the stirring action can be electronically powered by a motor based in the lid, or it can be mechanically powered by a wind-up mechanism that stores mechanical energy and then releases it (to cause the stirring element to move) upon the user pushing a button or lever atop the lid. Accordingly, other embodiments are within the scope of the claims.

What is claimed is:

1. A drinking apparatus comprising:
   a. a mug body to hold a beverage and having an open top;
   b. a lid fitted to the open top of the mug body and having a base in which a sipper hole is formed, a raised rim extending upward from the base at its periphery and having a shape selected to provide a mouthpiece at which a user is to sip the beverage out through the sipper hole;
   c. a sipping mechanism having a flap coupled to the lid so as to rotate about a pivot axis, between a closed position in which the sipper hole in the lid is blocked to prevent leakage, and an open position through which there can be beverage flow out of the mug body through the sipper hole; and
   d. a stirring mechanism having a handle atop the lid, the handle being coupled to an arm extending down from a bottom of the lid into the mug body, and a stirring element coupled to the arm at a position inside the mug body, the stirring mechanism to translate linear movement of the handle into rotation of the arm.

2. The drinking apparatus of claim 1 wherein the pivot axis crosses the handle.

3. The drinking apparatus of claim 2 wherein the handle is fixed laterally and is free to move vertically and wherein rotation of the arm is caused by pushing the handle downward.

4. The drinking apparatus of claim 3 wherein the arm of the stirring mechanism comprises a helical screw shaft to which the handle attached.

5. The drinking apparatus of claim 2 wherein the handle is fixed laterally and is free to move vertically, the arm of the stirring mechanism comprising a helical screw shaft to which the handle attached.

6. The drinking apparatus of claim 2 wherein the mug body is thermally insulated.

7. The drinking apparatus of claim 6 wherein the mug body has an interior volume between ten (10) ounces to thirty-two (32) ounces.

8. The drinking apparatus of claim 6 wherein the mug body is substantially cylindrical and has a peak outside diameter between 2.25 to 5 inches.

9. The drinking apparatus of claim 1 wherein the stirring element comprises an infusion compartment.

10. The drinking apparatus of claim 1 wherein the stirring element comprises an agitator element having a substantially vertical flap transverse to the arm.

11. The drinking apparatus of claim 10 wherein the stirring element further comprises an infusion compartment coupled to the arm at a position longitudinally spaced above the agitator element.

12. The drinking apparatus of claim 1 wherein the handle is fixed laterally and is free to move vertically, the stirring mechanism comprising a spring that loads the handle upward and wherein rotation of the arm is caused by pushing the handle downward.

13. The drinking apparatus of claim 1 wherein the handle is fixed laterally and is free to move vertically and wherein rotation of the arm is caused by pushing the handle downward.

14. The drinking apparatus of claim 13 wherein the arm of the stirring mechanism comprises a helical screw shaft to which the handle attached.

15. The drinking apparatus of claim 1 wherein the mug body is thermally insulated.

16. The drinking apparatus of claim 15 wherein the mug body has an interior volume between ten (10) ounces to thirty-two (32) ounces.

17. The drinking apparatus of claim 1 wherein the mug body is substantially cylindrical and has a peak outside diameter between 2.25 to 5 inches.

\* \* \* \* \*